United States Patent [19]
Rockwell et al.

[11] Patent Number: 5,357,062
[45] Date of Patent: Oct. 18, 1994

[54] PRESSURE SENSING APPARATUS FOR DIGITIZER PEN TIP

[75] Inventors: Lynn H. Rockwell, Mesa; Kenneth B. Jacobson, Scottsdale; James S. Watson; Steven M. Palay, both of Phoenix, all of Ariz.

[73] Assignee: CalComp Inc., Anaheim, Calif.

[21] Appl. No.: 10,536

[22] Filed: Jan. 28, 1993

[51] Int. Cl.⁵ .............................................. G08C 21/00
[52] U.S. Cl. ............................. 178/18; 345/179; 382/3
[58] Field of Search ............... 178/18, 19, 20; 382/3; 345/179; 364/709.11

[56] References Cited

U.S. PATENT DOCUMENTS

| | | | |
|---|---|---|---|
| 4,263,592 | 4/1981 | Takahashi et al. | 178/18 X |
| 4,268,730 | 5/1981 | Higgins et al. | 178/18 X |
| 4,318,096 | 3/1982 | Thornburg et al. | |
| 4,580,007 | 4/1986 | Searby et al. | 178/18 |
| 4,667,182 | 5/1987 | Murphy | 178/18 X |
| 4,786,764 | 11/1988 | Padula et al. | 178/18 |

*Primary Examiner*—Stephen Chin
*Assistant Examiner*—Paul Loomis
*Attorney, Agent, or Firm*—Wm. F. Porter, Jr.; Donald Streck

[57] ABSTRACT

In a pen cursor for use in performing writing motions on the surface of a tablet, this is a sensor for mounting in a tip portion of the pen cursor to develop a signal output indicating longitudinal force on a writing tip of the pen cursor. A tip member extends from the tip portion of the pen cursor and is mounted for longitudinal movement. It has a plunger portion extending therefrom within the pen cursor. A resistive member and a conductive member are disposed within the pen cursor behind the plunger portion. The plunger portion forces the resistive member and the conductive member together in electrical contact over a contacting area which is directly proportional to the amount of longitudinal pressure on the plunger portion. A voltage is connected across the contacting area whereby resistance as a function of longitudinal pressure on the plunger portion can be measured.

29 Claims, 7 Drawing Sheets

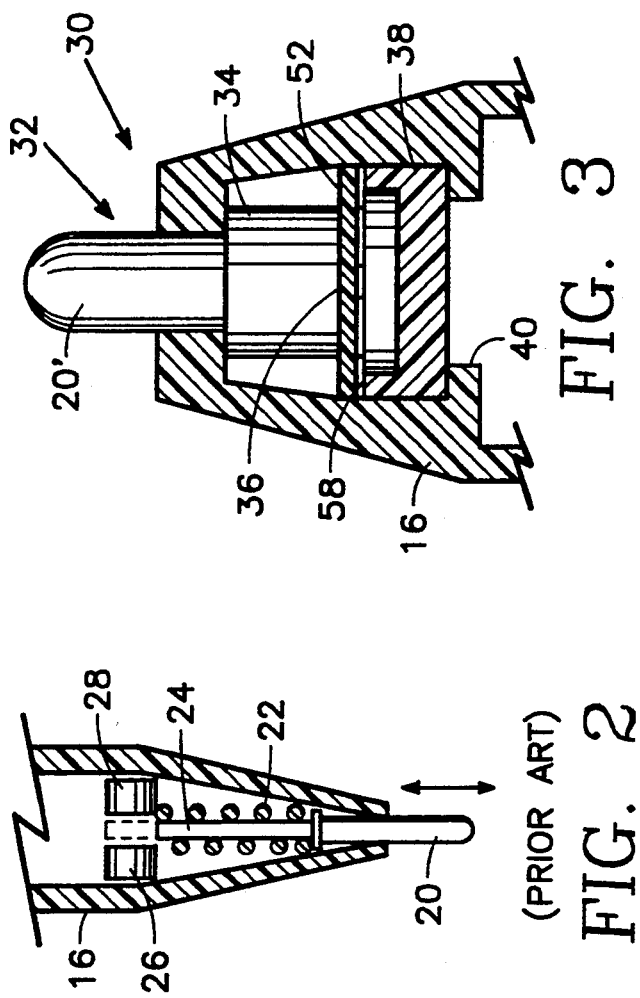

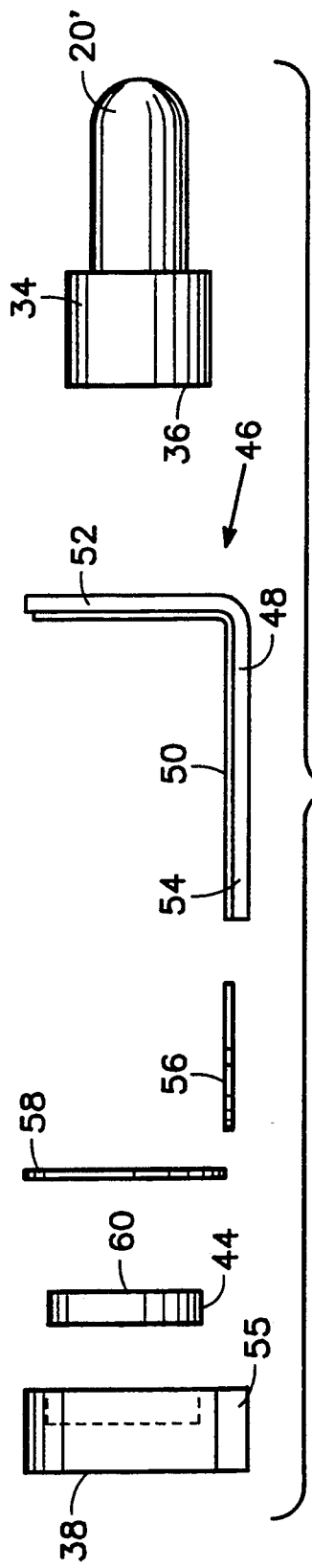
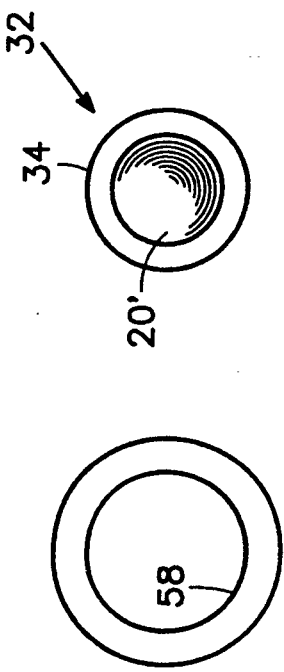
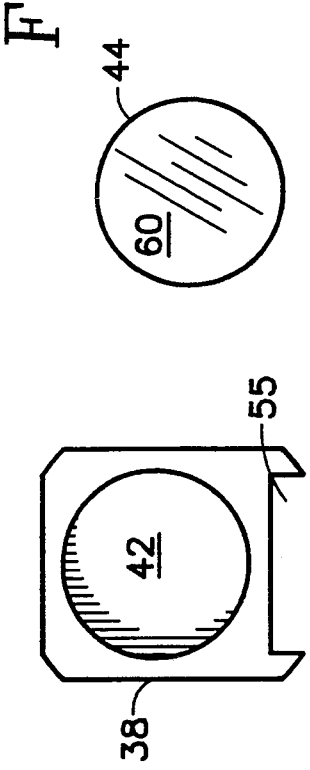
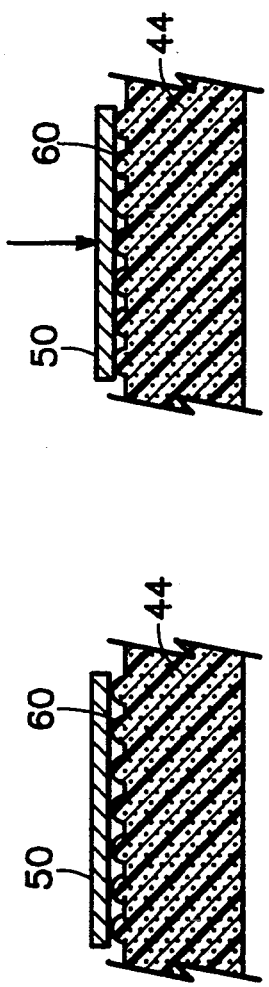

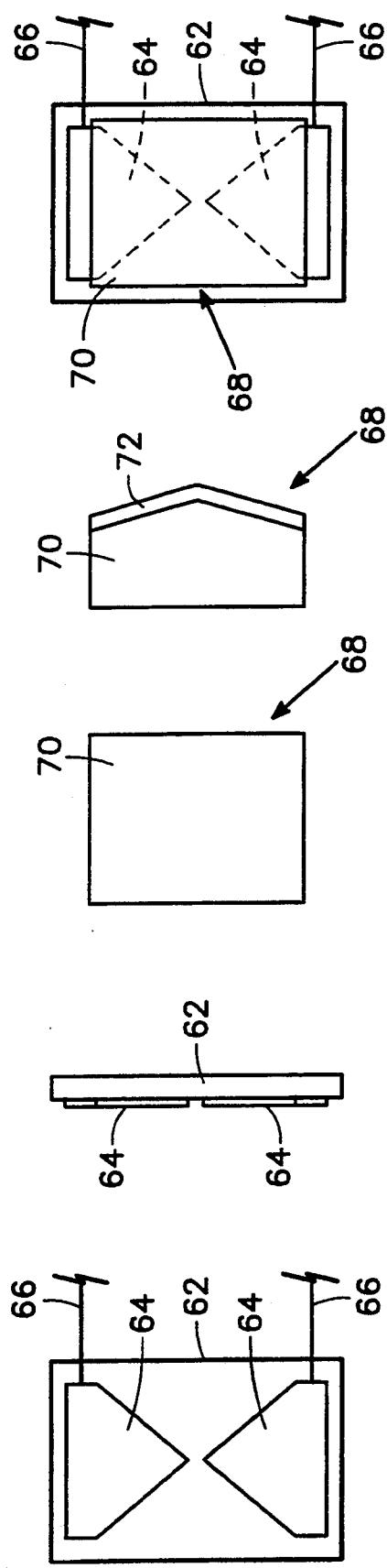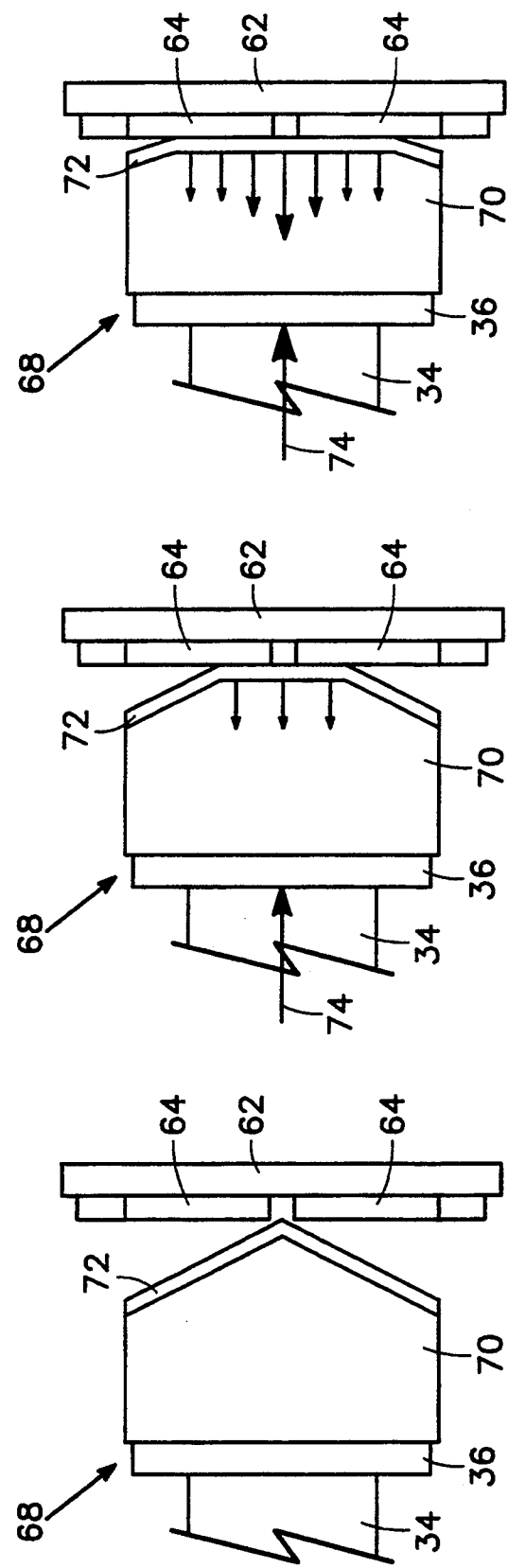

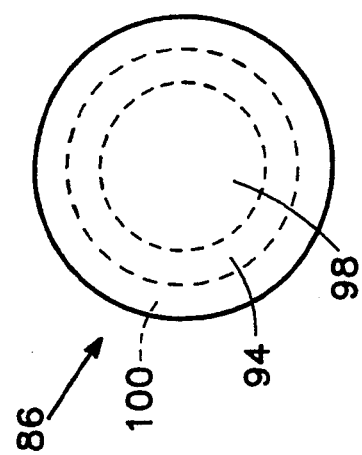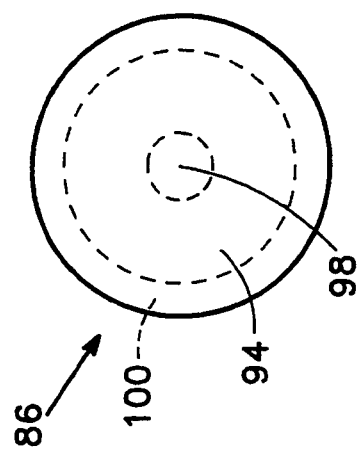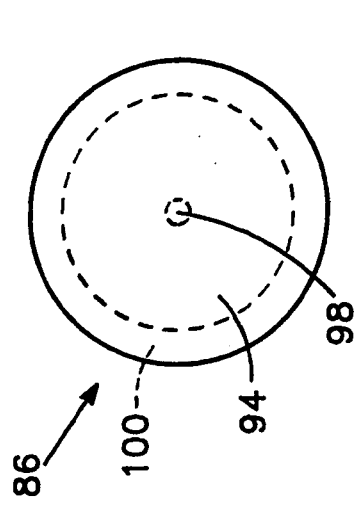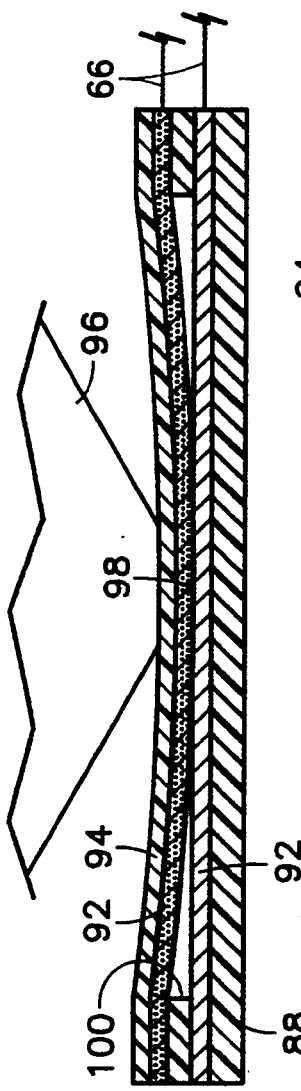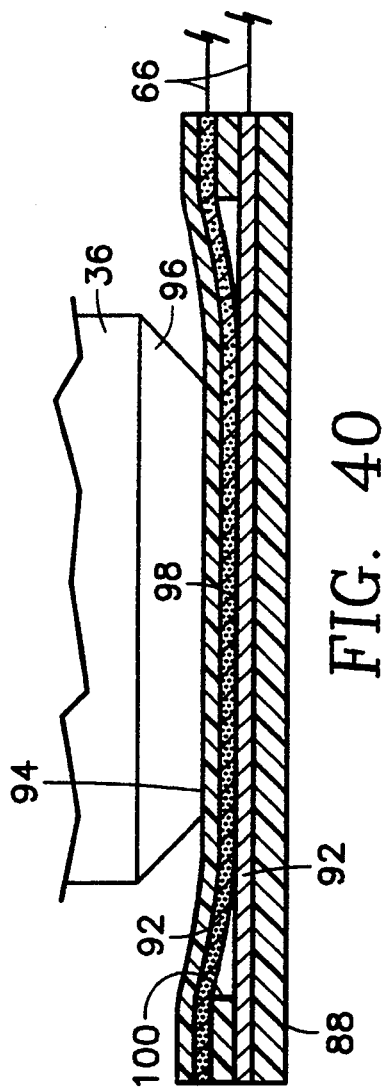
FIG. 36
FIG. 37
FIG. 38
FIG. 39
FIG. 40

PRESSURE SENSING APPARATUS FOR DIGITIZER PEN TIP

BACKGROUND OF THE INVENTION

This invention relates to digitizer tablet systems and, more particularly, in a pen cursor for use in performing writing motions on the surface of a tablet, to a sensor for mounting in a tip portion of the pen cursor to develop a signal output indicating longitudinal force on a writing tip of the pen cursor comprising, a tip member extending from the tip portion of the pen cursor and mounted for longitudinal movement, the tip member having a plunger portion extending therefrom within the pen cursor; a resistive member disposed within the pen cursor behind the plunger portion; a conductive member disposed within the pen cursor adjacent the resistive member behind the plunger portion; compressing means for the plunger portion to force the resistive member and the conductive member together in electrical contact over a contacting area which is directly proportional to the amount of longitudinal pressure on the plunger portion; and, connection means for connecting a voltage across the contacting area whereby resistance as a function of longitudinal pressure on the plunger portion can be measured.

In a digitizing tablet system, a cursor is moved over the surface of a tablet to input positional information related to an X,Y coordinate system associated with the tablet to a computer connected to the tablet. To allow the user to indicate when positional information is to be taken, and the like, the cursor typically has one or more manually-operable buttons associated with it. Recently, for use with so-called pen-driven computing systems where a digitizing tablet associated with a display is the primary input device for the computer, cordless digitizers having no physical connection between the cursor and the tablet have become the configuration of choice because of their added convenience to the user.

The elements of a typical cordless digitizer system are shown in simplified form in FIG. 1. The system 10 comprises a tablet 12 having a connecting cable 14 (or optical link) to the computer (not shown). There is also a cursor 16 having one or more buttons 18 thereon. The cursor 16 is typically about the size of an average fountain pen. In implementations according to techniques employed by the assignee of this application, the cursor 16 is powered by a small lithium battery of the type employed in hearing aids and the like. Accordingly, it can be appreciated that low power consumption as well as reliability are both important aspects of the manner of operation. The cursor 16 contains a coil which is driven by a pulse stream for positional sensing purposes. The coil emits a corresponding stream of AC magnetic pulses which are sensed by scanned sensing grids in the tablet. The signals developed in the sensing grids are then employed to determine the position of the cursor 1.6 on the surface of the tablet 12 according to techniques which are well known to those skilled in the art and which form no part of the present invention.

For handwriting analysis of operator inputs, and the like, as desired in the so-called pen-driven computing systems which are presently achieving increased attention and popularity, data about the angle of the cursor 16 and the pressure on the cursor 16 against the tablet 12 may be developed and transmitting to the tablet 12 for further transmission to the computer for use in the analysis process. A typical prior art approach to sensing the pressure of the cursor 16 against the tablet 12 so as to develop a signal reflecting that pressure for transmission to the computer is shown in FIG. 2. The cursor 16 has a longitudinally movable tip 20 which is biased to an extended position by a spring 22. As pressure is applied to the tip 20 the tip 20 slides into the body of the cursor 16 against the biasing force of the spring 22. The greater the pressure, the further the tip 20 slides into the body of the cursor 1.6. The tip 20 carries a light-blocking strip 24 on its inner end which moves in combination with the tip 20. There is a light emitting diode 26 and a photodiode 28 positioned on opposite sides of the path of the light-blocking strip 24. With the tip 20 fully extended (i.e. with no pressure on the tip 20), light from the light emitting diode 26 strikes the photodiode 28 fully and a maximum signal is output from the photodiode 28. As pressure is applied to the tip 20 and the tip 20 moves into the body of the cursor 1.6, the light-blocking strip 24 moves between the light emitting diode 26 and the photodiode 28 blocking a portion of the light striking the photodiode 28 and reducing the signal output therefrom. The light continues to be blocked in greater amounts until the photodiode 28 is completely blocked at the maximum pressure level which is sensible.

While the above-described apparatus of FIG. 2 does develop a signal which reflects the pressure on the tip 20, the longitudinal sliding movement required to develop that signal is unnatural during a writing action with the cursor as users are used to writing with pencils, pens, and ball-point pens which do not move longitudinally at their tips as a function of the pressure being applied. Additionally, the apparatus of FIG. 2 occupies necessary space in the body of the cursor 16 which can better be used for other purposes and has a high current consumption which is particularly undesirable in a cordless cursor where the total power available is a small lithium battery as mentioned above. Also, the apparatus of FIG. 2 has a high cost of manufacture and it is not easily adjustable for different applications. For example, the sensitivity is fixed by the amount of movement required to cover the photodiode 28 in amounts which will produce a detectable signal change and the spring constant of the spring 22.

As an alternate possibility and approach to the apparatus of FIG. 2, one could use a force-sensing resistor connected to the tip 20 such as those sold commercially by the Interlink corporation. While such a force-sensing resistor is preferable to the apparatus of FIG. 2, it also has many of the same problems in that it is not easily adjustable for different applications.

A related approach is disclosed in U.S. Pat. No. 4,318,096 to Thornberg et al. in which the force-sensing element comprises the opposite (back) end of the shaft (instead of the tip or front end). No plunger element separate from the shaft and from the force-sensing element is provided. Therefore, the contact area between the small back end of the shaft and the force-sensing element is what varies with the applied force. The disadvantage is that the area of the back end of the shaft is very small.

Wherefore, it is an object of this application to provide a sensor for sensing longitudinal pressure on the tip of a digitizer pen cursor and developing an output signal reflecting the instantaneous pressure wherein there is virtually no detectable longitudinal movement of the pen tip.

It is another object of this application to provide a sensor for sensing longitudinal pressure on the tip of a digitizer pen cursor and developing an output signal reflecting the instantaneous pressure wherein characteristics of the sensor such as sensitivity are easily adjustable for different applications. It is still another object of this application to provide a sensor for sensing longitudinal pressure on the tip of a digitizer pen cursor and developing an output signal reflecting: the instantaneous pressure which is easy and practical to build in commercial quantities and which resists malfunctioning from misalignment during assembly.

Other objects and benefits of the invention will become apparent from the detailed description which follows hereinafter when taken in conjunction with the drawing figures which accompany it.

SUMMARY

The foregoing objects have been achieved in a pen cursor for use in performing writing motions on the surface of a tablet by the sensor of the present invention for mounting in a tip portion of the pen cursor to develop a signal output indicating longitudinal force on a writing tip of the pen cursor comprising, a tip member extending from the tip portion of the pen cursor and mounted for longitudinal movement, the tip member having a plunger portion extending therefrom within the pen cursor; a resistive member disposed within the pen cursor behind the plunger portion; a conductive member disposed within the pen cursor adjacent the resistive member behind the plunger portion; compressing means for the plunger portion to force the resistive member and the conductive member together in electrical contact over a contacting area which is directly proportional to the amount of longitudinal pressure on the plunger portion; and, connection means for connecting a voltage across the contacting area whereby resistance as a function of longitudinal pressure on the plunger portion can be measured.

According to one embodiment, the sensor additionally comprises, the resistive member being of a carbon-impregnated elastomeric material disposed within the pen cursor behind the plunger portion, the resistive member further having a textured surface having projections curved in cross-section extending outward therefore; a pair of conductive contacts disposed above the textured surface and parallel thereto; and, pressure transfer means disposed between the plunger portion and the pair of conductive contacts for urging the pair of conductive contacts against the projections as a function of increased longitudinal pressure on the tip member to flatten the projections and place increased surface area of the carbon-impregnated elastomeric material in contact with the pair of conductive contacts whereby electrical current through the resistive member between the pair of conductive contacts is proportional to longitudinal pressure on the tip member.

Preferably, the pressure transfer means comprises an insulating substrate carrying the pair of conductive contacts thereon and the pair of conductive contacts comprise conductive ink traces on the insulating substrate. Additionally, the resistive member is a disk of the carbon-impregnated elastomeric material and the plunger member is cylindrical in shape and has a circular contacting surface concentrically aligned with the disk.

In another embodiment, the resistive member comprises a pair of spaced contacts of a resistive material and the conductive member comprises a compressing member of a compressible material having a flexible conductive outer layer adjacent the pair of spaced contacts, the flexible conductive outer layer being pressed against the pair of spaced contacts by the plunger portion to form an increasing the contacting area as the compressible material is increasingly compressed against the pair of spaced contacts by increased longitudinal pressure on the tip member.

In one version of this embodiment, the pair of spaced contacts are triangular in shape with triangular apexes in adjacent proximity and the compressing member has a wedge shaped surface facing the pair of spaced contacts. In another, the pair of spaced contacts are triangular in shape with triangular apexes in adjacent proximity and the compressing member is cylindrical in shape and is disposed transverse to the pair of spaced contacts. In still another, the pair of spaced contacts are rectangular in shape in the contacting area and the compressing member has an angled surface facing the pair of spaced contacts and transverse thereto.

In still another embodiment, the conductive member comprises a pair of spaced contacts of a conductive material and the resistive member comprises a compressing member of a compressible resistive material, the compressible resistive material being pressed against the pair of spaced contacts by the plunger portion to form an increasing the contacting area as the compressible resistive material is increasingly compressed against the pair of spaced contacts by increased longitudinal pressure on the tip member. Preferably, the pair of spaced contacts are rectangular in shape in the contacting area and the compressing member has an angled surface facing the pair of spaced contacts and transverse thereto.

In a preferred embodiment, the conductive member and the resistive member comprise a unitary structure wherein the conductive member and the resistive member are held in spaced relationship by an insulating member adjacent peripheral edges thereof and the compressing means comprises a soft deformable member carried by the plunger portion which forces the resistive member and the conductive member together in electrical contact over the contacting area in an increasing amount as the soft deformable member is compressed in direct proportional to the amount of longitudinal pressure on the plunger portion.

Also, the soft deformable member is conical in shape having an apex thereof facing the unitary structure and being an initial point of contact therewith. In addition, the conductive member comprises an ink layer on a first insulating substrate; the resistive member comprises an ink layer on a second insulating substrate; and, the first insulating substrate and the second insulating substrate are parallel with ink layers facing one another to form the contacting area. Also, the first insulating substrate is an elastomeric material which deforms under pressure the second insulating substrate is a rigid material.

In one version, one ink layer is a silver ink and the other ink layer is a carbon/silver ink. In another version, both ink layers are carbon/silver ink.

DESCRIPTION OF THE DRAWINGS

FIG. 1 is a simplified elevation drawing of the components of a typical digitizing tablet system.

FIG. 2 is a cutaway drawing of the tip of a digitizer pen showing a prior art approach to sensing tip pressure.

FIG. 3 is an enlarged cutaway drawing of the tip of a digitizer pen showing apparatus for sensing tip pressure according to the present invention in a first embodiment.

FIG. 4 is an exploded plan view of the apparatus of FIG. 3.

FIG. 5 is an exploded side elevation view of the apparatus of FIG. 3.

FIG. 6 is a front elevation view of the elastomer holding block of the present invention.

FIG. 7 is a front elevation view of the carbon-impregnated elastomer disk of the present invention.

FIG. 8 is a front elevation view of the mylar spacer ring of the present invention.

FIG. 9 is a front elevation view of the tip plunger of the present invention.

FIGS. 10-12 are enlarged, simplified, cutaway drawings of the carbon-impregnated elastomer disk showing the principal of operation of the present invention in the first embodiment.

FIG. 13 is a plan view of the shaped resistive contacts of a second embodiment of the present invention.

FIG. 14 is a side view of the shaped resistive contacts of FIG. 13.

FIG. 15 is a plan view of the deformable conductive contact of the second embodiment of the present invention.

FIG. 16 is a side view of the deformable conductive contact of FIG. 15.

FIG. 17 is a plan view showing the deformable conductive contact placed over the shaped resistive contacts for use in the second embodiment of the present invention.

FIG. 18 is a side view showing the relationship of the deformable conductive contact deformable conductive contact to the shaped resistive contacts before any pressure is put on the pen tip.

FIG. 19 is a side view showing the relationship of the deformable conductive contact to the shaped resistive contacts after some pressure is put on the pen tip.

FIG. 20 is a side view showing the relationship of the deformable conductive contact to the shaped resistive contacts after greater pressure is put on the pen tip.

FIG. 36 is a simplified plan view of the unitary sensor as in FIG. 31 showing the contact area between the two sides with an initial pen pressure applied thereto.

FIG. 37 is a simplified plan view of the unitary sensor as in FIG. 31 showing the contact area between the two sides with a medium pen pressure applied thereto.

FIG. 38 is a simplified plan view of the unitary sensor as in FIG. 31 showing the contact area between the two sides with a large pen pressure applied thereto.

FIG. 39 is a detailed cutaway drawing of the unitary sensor in the implementation of FIG. 32 under a small pen pressure.

FIG. 40 is a detailed cutaway drawing of the unitary sensor in the implementation of FIG. 32 under a large pen pressure.

DESCRIPTION OF THE PREFERRED EMBODIMENT

Figure 21:
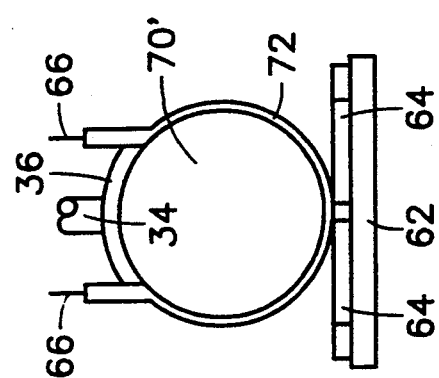
FIG. 21 is a side view showing an alternate configuration for the deformable conductive contact in the second embodiment of the present invention before any pressure is put on the pen tip.

The pen pressure sensor of the present invention in a first embodiment is shown assembled and mounted in the tip of a pen cursor 16 in FIG. 3 where it is generally indicated as 30. The components forming the sensor 30 are shown exploded and individually in FIGS. 4-9. The principal of operation of this embodiment is depicted in FIGS. 10-12.

A plunger assembly 32 of unitary construction comprises a cylindrical tip 20' with a rounded outer end extending out of the body of the cursor 16 in the manner of the tip 20 of FIG. 2 so as to contact the surface of a tablet being used with the cursor 16. Note that while a cordless cursor 16 is depicted and is the primary intended recipient of the present invention in commercial practice, the invention can also be employed in a corded cursor digitizing system. Extending inward into the body of the cursor 16 from the tip 20' is a cylindrical plunger 34. As will be seen shortly, the plunger assembly 32 is virtually motionless in use.

Behind the plunger's inner end 36 and parallel thereto at a slightly spaced distance is an elastomer holding block 38 which is supported by the body of the cursor 16 as with the shoulder 40. The elastomer holding block 38 contains a cylindrical depression 42 in the surface thereof facing the plunger's inner end 36 and concentric thereto. A carbon-impregnated elastomer disk 44 is disposed in the cylindrical depression 42. The construction of the disk 44 will be addressed in greater detail shortly.

As best understood with reference to FIGS. 4 and 5, the remaining major component of the sensor 30 is the contact strip 46. The contact strip 46 comprises an insulating flexible substrate strip 48 of mylar (or the like) having a pair of conductive silver ink traces 50 formed thereon as by a silk screening process of the type well known in the art. The substrate strip 48 is bent into an L-shape with one portion 52 disposed between the plunger's inner end 36 and the disk 44 and another portion 54 extending through a slot 55 in the elastomer holding block 38 provided therefor to provide a place for electrical attachment of the sensor 30. A pair of metal contacts 56 are electrically attached and connected to respective ones of the ends of the two conductive ink traces 50 for connection to other wiring in the cursor 16. The metal contacts 56 can be attached to the ends of the conductive ink traces 50 in electrical contact therewith by employing a two-sided electrically conductive adhesive tape of the type commercially available from the 3M Company. Finally, a thin, annular, mylar spacer 58 is disposed between the one portion 52 of the substrate strip 48 and the disk 44 to compensate for the thickness of the conductive ink traces 50 and prevent the conductive ink traces 50 from pushing against the surface of the disk 44 in the absence of longitudinal pressure on the tip 20'. For ease of assembly and alignment of the parts, it is preferred that the spacer 58 have an adhesive on the surface facing the one portion 52 of the substrate strip 48 so as to adhesively attach it thereto.

Turning now to FIGS. 10-12, the manner of operation and the construction of the disk 44 to accomplish the objectives of the present invention according to this embodiment will now be discussed in greater detail.

As mentioned earlier, the disk 44 is a carbon-impregnated elastomeric material. Such materials and their methods of manufacture to obtain the desired characteristics are well known to those skilled in the art and, therefore, in the interest of simplicity and the avoidance of redundancy, no extremely detailed explanation thereof will be provided herein. As will be recognized and understood by those skilled in the art from the several embodiments to be described hereinafter, the basic principal of operation of the present invention is to employ a resistive material in a current sensing path and vary the contact area (and thereby the resistance interposed in the electrical path) as a function of the pen pressure.

As depicted in FIGS. 7 and 10-12, the surface of the disk 44 facing the conductive ink traces 50 is textured to form raised, curved projections 60. The spacer 58 is sized in thickness so as to position the ink traces 50 just above the projections 60 as depicted in FIG. 10. As longitudinal pressure is applied to the tip 20', it results in pressure of the plunger's inner end 36 against the one portion 52 of the substrate strip 48 thereby forcing the ink traces 50 against the projections 60 as depicted in FIG. 11. Being of an elastomeric material, the projections 60 offer a biasing force against more than token longitudinal movement of the plunger 34. Moreover, as a function of the force applied to the tip 20', the projections 60 are flattened and offer an increased surface area in contact with the ink traces 50. As those skilled in the art will readily recognize and appreciate, a carbon-impregnated material is conductively resistive in nature and the current carrying characteristics of the disk 44 between the two ink traces 50 is directly proportional to the surface area of the carbon-impregnated material in contact with the ink traces 50. Thus, as the force on the tip 20' is increased, the projections 60 are flattened even further and more area of the carbon-impregnated material is placed in contact with the ink traces 50, as depicted in FIG. 12. Thus, the current signal developed by a voltage applied across the two ink traces 50 will be directly proportional to the force on the tip 20'.

Having thus described the manner of operation of the sensor 30, those skilled in the art will readily appreciate the ways in which the operating characteristics of the sensor 30 of the invention in this embodiment can be adjusted. For one, the composition and thereby the resistivity of the disk 44 can be changed to vary the sensitivity. Changing the thickness of the mylar spacer 58 will change the contact force. The shape and thickness of the textured surface of the disk 44 can be used to change the sensitivity. Sensitivity can also be adjusted by the diameter of the plunger 34 as it determines how much area of the ink traces 50 will be forced against the projections 60. The width of the ink traces 50 also effects sensitivity for the same reason. As will be appreciated with respect to the other embodiments now to be described, they can be changed in their characteristics in like manners. Again, it should be remembered that the basic approach of all the embodiments is to change pen pressure into a change in contact area with a resistive material so that resistance changes in proportion to pen pressure. Thus, changing the resistive material, the shape of the deformable portion creating the contact, the elastic constant and type of the deformable material, and the like, can all be employed to achieve any particular desired results. For ease of understanding, simplicity, and the avoidance of redundancy, the remaining embodiments will not be shown in as great a detail as to their actual attachment within a cursor pen body as those aspects can easily be accomplished by ones of ordinary skill in the art by simply adapting the approach of the first embodiment.

Turning now to FIGS. 13 through 20, a second embodiment of the present invention will now be described. As those skilled in the art will readily appreciate, whatever embodiment is used for a particular application, commercial manufacture and assembly considerations will have a large bearing on other than small run operations. Thus, repeatability of performance in commercial quantities becomes a large factor along with ease of manufacture and assembly. FIGS. 13 and 14 show plan and side views, respectively, of a substrate 62 having a pair of shaped resistive contacts 64 thereon. The shaped resistive contacts 64 are connected to wires 66 for connecting them into the sensing circuitry. FIGS. 15 and 16 show plan and side views, respectively, of a deformable contact 68. The deformable contact 68 is a wedge-shaped piece of flexible rubber 70 having a conductive coating 72 on the wedge portion facing the shaped resistive contacts 64 when the two portions are assembled as in FIGS. 17-20. In tested embodiments, the width across the two shaped resistive contacts 64 was approximately 0.2 inches and the contacts themselves were formed from carbon/silver ink having a resistance of approximately ten K-ohms per square centimeter. The conductive coating 72 in the tested embodiment was a conductive rubber elastomer having a resistance of approximately forty-five ohms per square centimeter. The deformable contact 68 is forced against the two shaped resistive contacts 64 by the pressure of the pen plunger 34 on its inner end 36 as indicated by the arrows 74 of FIGS. 19 and 20. As this happens, the shape of the rubber 70 changes as it is compressed to as to touch a greater width of the resistive ink of the two shaped resistive contacts 64. Since the rubber elastomer is orders of magnitude more conductive than the resistive ink, it acts as a short and reduces the resistance between the wires 66 as the area of the rubber/ink contact increases.

Figure 22:
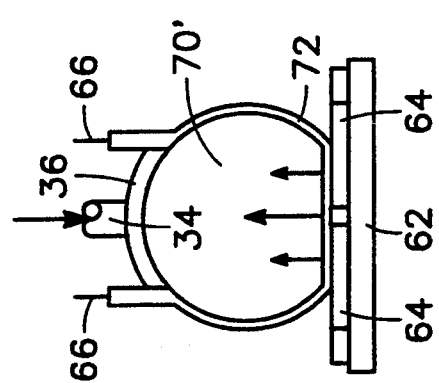
FIG. 22 is a side view of the alternate configuration of FIG. 21, after pressure has been put on the pen tip.
Figure 27:
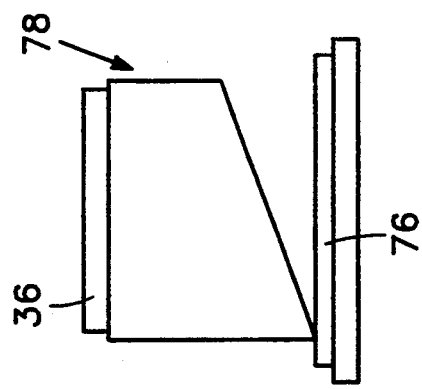
FIGS. 27 and 28 are side views showing how the deformable contact works in combination with the pair of contacts according to the fourth embodiment of the present invention.

An alternate implementation to this embodiment is depicted in FIGS. 21 and 22, in this case, the wedge-shaped deformable contact 68 is replaced with a cylindrical piece of flexible rubber 70' having the conductive coating 72 on the outer surface thereof at least in that portion facing the shaped resistive contacts 64 when the two portions are assembled as in FIGS. 27-22. The shorting action of the two shaped resistive contacts 64 is substantially the same.

Figure 23:
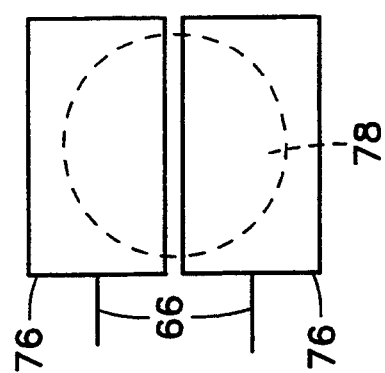
FIG. 23 is a plan view of a pair of contacts which can be employed in third and fourth embodiments of the present invention showing one possible shape of deformable contact to be used therewith in ghosted form.
Figure 24:
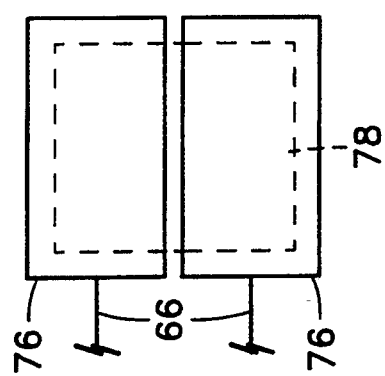
FIG. 24 is a plan view of the pair of contacts of FIG. 23 showing another possible shape of deformable contact to be used therewith in ghosted form.
Figure 25:
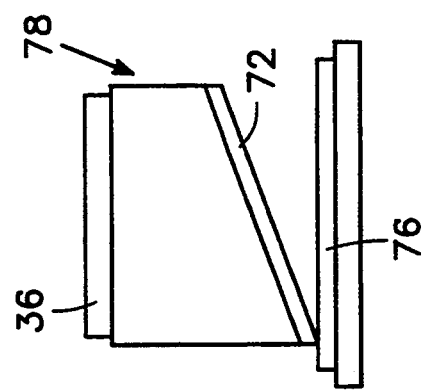
FIGS. 25 and 26 are side views showing how the deformable contact works in combination with the pair of contacts according to the third embodiment of the present invention.
Figure 26:
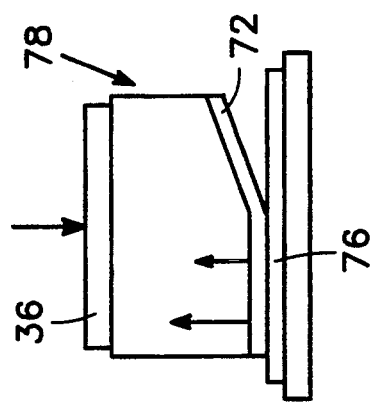
Figure 28:
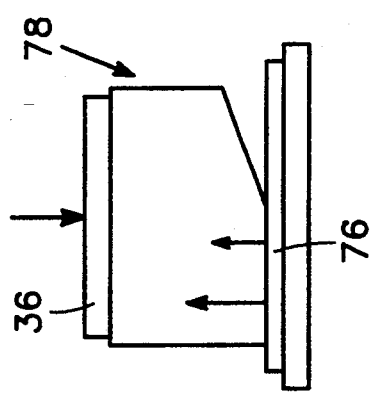

As depicted in FIGS. 23 and 24, the pair of bridged contacts can be rectangular in shape in the bridged portion rather than being triangular as in the prior embodiment. Also, as shown ghosted in those figures, the cross-section of the bridging contact can be of various shapes such as circular and square (or rectangular). The resistance curve of the sensor of these embodiments can be established in any manner desired by simply shaping the bridged contacts and/or the bridging contact employing general principles of geometry which determine the dynamic areas of contacts in combination with the laws of resistance as are well known by those of ordinary skill in the art. Note also that either the bridged contacts and/or the bridging contact can be the resistive element. For example, in FIGS. 25 and 26 the bridged contacts 76 are resistive and the bridging contact 78 has a conductive rubber elastomer coating 72 as in the prior embodiments. By contrast, FIGS. 27 and 28 illustrate a possible embodiment wherein the bridged contacts 76 are a silver conductive ink and the bridging contact 78 is formed of a carbon-impregnated elastomer as in the very first embodiment so that the resistive path through the bridging contact 78 changes as a function of how much area is in contact with the bridged contacts 76. Of course, one could also make the combination of the bridging contact 78 having a conductive rubber elastomer coating 72 and the bridged contacts 76 being of a resistive carbon/silver mix.

Figure 29:
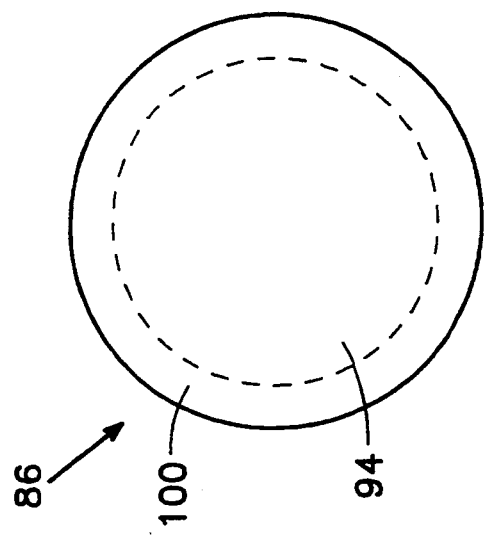
FIG. 29 is a simplified partially cutaway drawing showing how the alignment of parts should occur when the first four embodiments of the present invention are incorporated into a cursor pen body.
Figure 30:
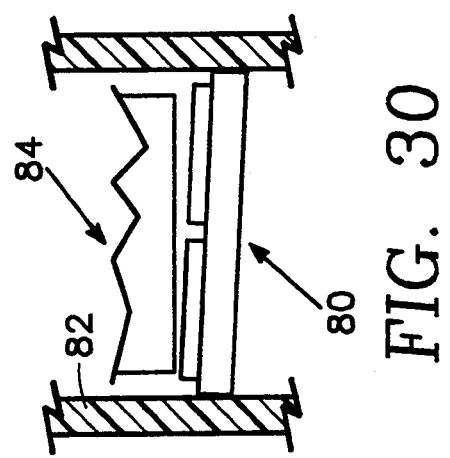
FIG. 30 is a simplified partially cutaway drawing showing how mis-alignment of parts can occur when the first four embodiments of the present invention are incorporated into a cursor pen body on a mass production basis.

As will be recalled, it was mentioned earlier that where there is to be commercial manufacture on a large scale, ease of manufacture and reliability under commercial manufacturing conditions becomes a major function. As will be appreciated by those skilled in the art, all the embodiments described heretofore operate in a manner as shown in FIGS. 29 and 30. Basically, as depicted in FIG. 29, there is a first portion 80 which is carried by the cursor pen body 82 and a second portion 84 which is moved by the plunger inner end 34. If both portions 80, 84 are in proper alignment as depicted in .FIG. 29, the mating or bridging action takes place across the entirety of the facing surfaces and the sensor works properly. If, on the other hand, the two portions 80, 84 are not in proper alignment as depicted in FIG. 30, the mating or bridging action does not take place across the entirety of the facing surfaces and the sensor will not work properly. To assure proper alignment, therefore, tolerances must be set closer and the assembly process becomes much more labor intensive. Thus, what is needed for mass manufacturing is an embodiment of the present invention which will work properly despite minor misalignment of the working portions thereof. Such an embodiment is depicted in FIGS. 31 through 40.

Figure 31:
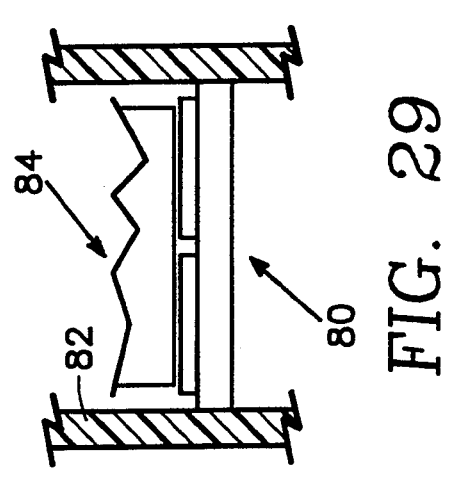
FIG. 31 is a simplified plan view of the unitary sensor of the fifth and preferred embodiment of the present invention.
Figure 32:
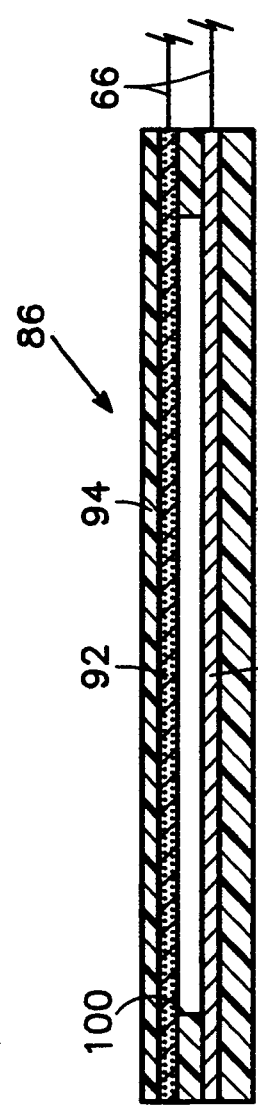
FIG. 32 is a detailed cutaway side view through the unitary sensor of FIG. 31 according to a first implementation thereof.
Figure 33:
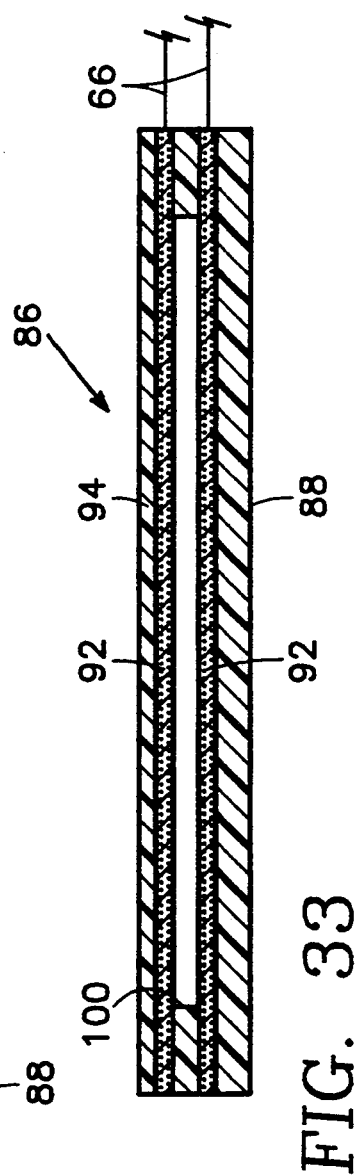
FIG. 33 is a detailed cutaway side view through the unitary sensor of FIG. 31 according to a second implementation thereof.

The key to eliminating the criticalities of alignment of the prior embodiments is two-fold. First, make the contacting portions in a unitary structure. Second, replace a one-dimensional or two-dimensional contact for actuation with a point actuation. As depicted in FIGS. 31-33, in this embodiment there is a unitary sensor 86. For placement within a cylindrical pen body 82, the sensor 86 can conveniently be disk-shaped as shown. Such a shape is not necessary, however, as will be appreciated from the description which follows. The sensor 86 comprises a bottom substrate 88 of a rigid insulative material such as printed circuit board material. The bottom substrate 88 can be covered with a conductive silver ink 90 as in FIG. 32 or with a resistive carbon/silver ink 92 (as used in the above-described embodiments) as in FIG. 33. A top substrate 94 is disposed over the bottom substrate 88. The top substrate 94 is of a deformable, elastomeric, insulative material such as Mylar and has a layer of resistive carbon/silver ink 92 thereon facing the conductive silver ink 90 as in FIG. 32 or the resistive carbon/silver ink 92 as in FIG. 33. While not depicted, the conductive silver ink 90 and the resistive carbon/silver ink 92 could be reversed as to substrate in the embodiment of FIG. 32. The wires 66 are, of course, electrically connected to the layers of ink 90, 92 at their periphery. It is preferred for reliability that layers of carbon/silver ink 92 have a peripheral conductive ring electrically connected thereto to which the wire 66 is attached. Any of the above-described configurations of the substrates 88, 94 can be easily accomplished by those of ordinary skill in the art employing well known printed circuit forming techniques and equipment. To prevent premature contact, an insulating ring 100 of Mylar or the like is disposed between the facing ink layers.

Figure 34:
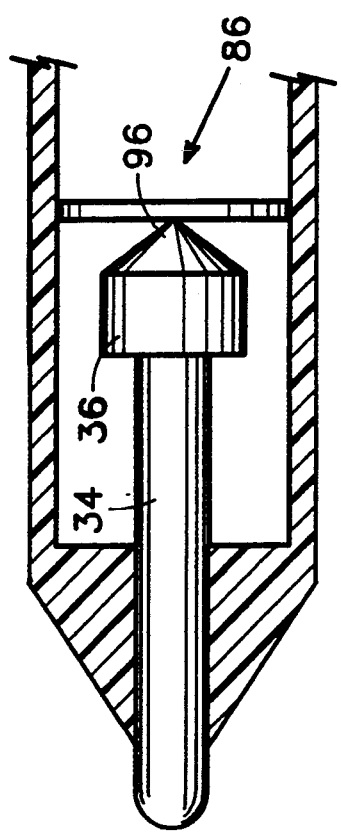
FIG. 34 is a simplified partially cutaway view of a cursor pen tip showing the fifth embodiment of the present invention installed therein an a properly aligned condition.
Figure 35:
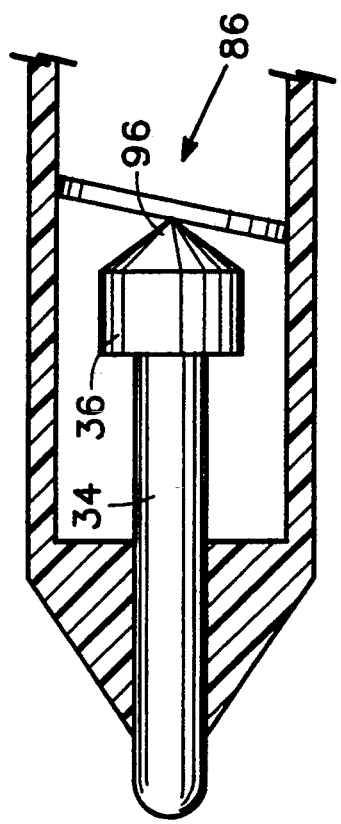
FIG. 35 is a simplified partially cutaway view of a cursor pen tip showing the fifth embodiment of the present invention installed therein an a mis-aligned condition and depicting how this embodiment still operates properly.

To make the point contact with the sensor 86, the approach of FIG. 34 is employed. The plunger inner end 36 carries a conical actuator 96 of soft rubber. Thus, as the point of the actuator 96 presses against the top substrate 94, it is compressed and expands in radius as a function of the pressure on it from the pen plunger 34. This action causes the two substrates 88, 94 to be pressed together in an ever-widening radius of contact area 98 as depicted in simplified form in FIGS. 36-38 and in greater detail in FIGS. 39 and 40. As depicted in FIG. 35, this action will take place even though the unitary sensor 86 is assembled in misalignment as depicted in FIG. 35. Thus, as desired, with this embodiment the manufacturing and assembly process is greatly simplified. As will undoubtedly have been realized and appreciated by those skilled in the art from the foregoing description, the performance characteristics of this embodiment can be adjusted by such factors as the thickness of the ring 100 (which sets the spacing between tile two ink layers), the material and thickness thereof used for tile top substrate 94, as well as the material and conical angle of the actuator 96. Other shapes could, of course, be employed for the actuator 96 other than conical to attain other performance characteristics.

Wherefore, having thus described the present invention, what is claimed is:

1. In a pen cursor for use in performing writing motions on the surface of a tablet, a sensor for mounting in a tip portion of the pen cursor to develop a signal output indicating longitudinal force on a writing tip of the pen cursor comprising:

a) a tip member extending from the tip portion of the pen cursor and mounted for longitudinal movement, said tip member having a plunger portion extending therefrom within the pen cursor;

b) a resistive member disposed within the pen cursor behind said plunger portion;

c) a conductive member separate from said plunger and disposed within the pen cursor adjacent said resistive member behind said plunger portion;

d) compressing means for said plunger portion to force said resistive member and said conductive member together in electrical contact over a contacting area which is directly proportional to the amount of longitudinal pressure on said plunger portion;

e) connection means for connecting a voltage across said contacting area whereby resistance as a function of longitudinal pressure on said plunger portion can be measured.

2. The sensor for a pen cursor of claim 1 wherein said resistive member is of a carbon-impregnated elastomeric material disposed within the pen cursor behind said plunger portion., said resistive member further having a textured surface having projections curved in cross-section extending outward therefrom, and wherein the sensor additionally comprises:

a) a pair of conductive contacts disposed above said textured surface and parallel thereto; and, b) pressure transfer means disposed between said plunger portion and said pair of conductive contacts for urging said pair of conductive contacts against said projections as a function of increased longitudinal pressure on said tip member to flatten said projections and place increased surface area of said carbon-impregnated elastomeric material in contact with said pair of conductive contacts whereby electrical current through said resistive member between said pair of conductive contacts is proportional to longitudinal pressure on said tip member.

3. The sensor for a pen cursor of claim 2 wherein:
said pressure transfer means comprises an insulating substrate carrying said pair of conductive contacts thereon.

4. The sensor for a pen cursor of claim 3 wherein:
said pair of conductive contacts comprise conductive ink traces on said insulating substrate.

5. The sensor for a pen cursor of claim 2 wherein:
a) said resistive member is a disk of said carbon-impregnated elastomeric material; and,
b) said plunger member is cylindrical in shape and has a circular contacting surface concentrically aligned with said disk.

6. The sensor for a pen cursor of claim 1 wherein:
a) said resistive member comprises a pair of spaced contacts of a resistive material; and,
b) said conductive member comprises a compressing member of a compressible material having a flexible conductive outer layer adjacent said pair of spaced contacts, said flexible conductive outer layer being pressed against said pair of spaced contacts by said plunger portion to form an increasing said contacting area as said compressible material is increasingly compressed against said pair of spaced contacts by increased longitudinal pressure on said tip member.

7. The sensor for a pen cursor of claim 6 wherein:
a) said pair of spaced contacts are triangular in shape with triangular apexes in adjacent proximity; and,
b) said compressing member has a wedge shaped surface facing said pair of spaced contacts.

8. The sensor for a pen cursor of claim 6 wherein:
a) said pair of spaced contacts are triangular in shape with triangular apexes in adjacent proximity; and,
b) said compressing member is cylindrical in shape and is disposed transverse to said pair of spaced contacts.

9. The sensor for a pen cursor of claim 6 wherein:
a) said pair of spaced contacts are rectangular in shape in said contacting area; and,
b) said compressing member has an angled surface facing said pair of spaced contacts and transverse thereto.

10. The sensor for a pen cursor of claim 1 wherein:
a) said conductive member comprises a pair of spaced contacts of a conductive material; and,
b) said resistive member comprises a compressing member of a compressible resistive material, said compressible resistive material being pressed against said pair of spaced contacts by said plunger portion to form an increasing said contacting area as said compressible resistive material is increasingly compressed against said pair of spaced contacts by increased longitudinal pressure on said tip member.

11. The sensor for a pen cursor of claim 10 wherein:
a) said pair of spaced contacts are rectangular in shape in said contacting area; and,
b) said compressing member has an angled surface facing said pair of spaced contacts and transverse thereto.

12. The sensor for a pen cursor of claim 1 wherein:
a) said conductive member and said resistive member comprise a unitary structure wherein said conductive member and said resistive member are held in spaced relationship by an insulating member adjacent peripheral edges thereof; and,
b) said compressing means comprises a soft deformable member carried by said plunger portion which forces said resistive member and said conductive member together in electrical contact over said contacting area in an increasing amount as said soft deformable member is compressed in direct proportional to the amount of longitudinal pressure on said plunger portion.

13. The sensor for a pen cursor of claim 12 wherein:
said soft deformable member is conical in shape having an apex thereof facing said unitary structure and being an initial point of contact therewith.

14. The sensor for a pen cursor of claim 12 wherein:
a) said conductive member comprises an ink layer on a first insulating substrate;
b) said resistive member comprises an ink layer on a second insulating substrate; and,
c) said first insulating substrate and said second insulating substrate are parallel with ink layers facing one another to form said contacting area.

15. The sensor for a pen cursor of claim 14 wherein:
a) said first insulating substrate is an elastomeric material which deforms under pressure; and,
b) said second insulating substrate is a rigid material.

16. The sensor for a pen cursor of claim 14 wherein:
a) one ink layer is a silver ink; and,
b) another ink layer is a carbon/silver ink.

17. The sensor for a pen cursor of claim 14 wherein:
a) one ink layer is a carbon/silver ink; and,
b) another ink layer is a carbon/silver ink.

18. In a pen cursor for use in performing writing motions on the surface of a tablet, a sensor for mounting in a tip portion of the pen cursor to develop a signal output indicating longitudinal force on a writing tip of the pen cursor comprising:
a) a tip member extending from the tip portion of the pen cursor and mounted for longitudinal movement, said tip member having a plunger portion extending therefrom within the pen cursor;
b) a resistive member disposed within the pen cursor behind said plunger portion;
c) a conductive member disposed within the pen cursor adjacent said resistive member behind said plunger portion;
d) compressing means for said plunger portion to force said resistive member and said conductive member together in electrical contact over a contacting area which is directly proportional to the amount of longitudinal pressure on said plunger portion; and,
e) connection means for connecting a voltage across said contacting area whereby resistance as a function of longitudinal pressure on said plunger portion can be measured; wherein,
f) said conductive member and said resistive member comprise a unitary structure wherein said conductive member and said resistive member are held in spaced relationship by an insulating member adjacent peripheral edges thereof; and,
g) said compressing means comprises a soft deformable member carried by said plunger portion which forces said resistive member and said conductive member together in electrical contact over said contacting area in an increasing amount as said soft deformable member is compressed in direct proportional to the amount of longitudinal pressure on said plunger portion.

19. The sensor for a pen cursor of claim 18 wherein:
said soft deformable member is conical in shape having an apex thereof facing said unitary structure and being an initial point of contact therewith.

20. The sensor for a pen cursor of claim 18 wherein:
a) said conductive member comprises an ink layer on a first insulating substrate;
b) said resistive member comprises an ink layer on a second insulating substrate; and,
c) said first insulating substrate and said second insulating substrate are parallel with ink layers facing one another to form said contacting area.

21. The sensor for a pen cursor of claim 20 wherein:
a) said first insulating substrate is an elastomeric material which deforms under pressure; and,
b) said second insulating substrate is a rigid material.

22. The sensor for a pen cursor of claim 20 wherein:
a) one ink layer is a silver ink; and,
b) another ink layer is a carbon/silver ink.

23. The sensor for a pen cursor of claim 20 wherein:
a) one ink layer is a carbon/silver ink; and,
b) another ink layer is a carbon/silver ink.

24. In a pen cursor for use in performing writing motions on the surface of a tablet, a sensor for mounting in a tip portion of the pen cursor to develop a signal output indicating longitudinal force on a writing tip of the pen cursor comprising:
a) a tip member extending from the tip portion of the pen cursor and mounted for longitudinal movement, said tip member having a plunger portion extending therefrom within the pen cursor;
b) a resistive member disposed within the pen cursor behind said plunger portion;
c) a conductive member separate from said plunger member and disposed within the pen cursor adjacent said resistive member behind said plunger portion, said conductive member and said resistive member comprising a unitary structure wherein said conductive member and said resistive member are held in spaced relationship by an insulating member adjacent peripheral edges thereof;
d) compressing means for said plunger portion to force said resistive member and said conductive member together in electrical contact over a contacting area which is directly proportional to the amount of longitudinal pressure on said plunger portion, said compressing means comprising a soft deformable member carried by said plunger portion which forces said resistive member and said conductive member together in electrical contact over said contacting area in an increasing amount as said soft deformable member is compressed; and,
e) connection means for connecting a voltage across said contacting area whereby resistance as a function of longitudinal pressure on said plunger portion can be measured.

25. The sensor for a pen cursor of claim 24 wherein:
said soft deformable member is conical in shape having an apex thereof facing said unitary structure and being an initial point of contact therewith.

26. The sensor for a pen cursor of claim 24 wherein:
a) said conductive member comprises an ink layer on a first insulating substrate;
b) said resistive member comprises an ink layer on a second insulating substrate; and,
c) said first insulating substrate and said second insulating substrate are parallel with ink layers facing one another to form said contacting area.

27. The sensor for a pen cursor of claim 26 wherein:
a) said first insulating substrate is an elastomeric material which deforms under pressure; and,
b) said second insulating substrate is a rigid material.

28. The sensor for a pen cursor of claim 26 wherein:
a) one ink layer is a silver ink; and,
b) another ink layer is a carbon/silver ink.

29. The sensor for a pen cursor of claim 26 wherein:
a) one ink layer is a carbon/silver ink; and,
b) another ink layer is a carbon/silver ink.

* * * * *